(12) United States Patent
Saxena et al.

(10) Patent No.: US 9,778,754 B2
(45) Date of Patent: Oct. 3, 2017

(54) METHOD FOR CONTROLLING ELECTRONIC APPARATUS AND ELECTRONIC APPARATUS APPLYING THE METHOD

(71) Applicant: HTC CORPORATION, Taoyuan (TW)

(72) Inventors: Abhishek Saxena, Taoyuan (TW); Chia-Wei Chen, Taoyuan (TW); Hsin-Hao Lee, Taoyuan (TW); Ssu-Po Chin, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 15/136,332

(22) Filed: Apr. 22, 2016

(65) Prior Publication Data

US 2016/0239102 A1    Aug. 18, 2016

Related U.S. Application Data

(63) Continuation of application No. 14/149,791, filed on Jan. 7, 2014.

(51) Int. Cl.
| | |
|---|---|
| *G09G 5/00* | (2006.01) |
| *G06F 3/02* | (2006.01) |
| *G06F 1/16* | (2006.01) |
| *G06F 1/32* | (2006.01) |
| *G06F 3/0346* | (2013.01) |
| *G06F 3/038* | (2013.01) |
| *G06F 3/16* | (2006.01) |
| *H04N 5/232* | (2006.01) |

(52) U.S. Cl.
CPC ............ *G06F 3/0227* (2013.01); *G06F 1/169* (2013.01); *G06F 1/1643* (2013.01); *G06F 1/1686* (2013.01); *G06F 1/1694* (2013.01); *G06F 1/3206* (2013.01); *G06F 1/3265* (2013.01); *G06F 3/038* (2013.01); *G06F 3/0346* (2013.01); *G06F 3/165* (2013.01); *H04N 5/232* (2013.01); *Y02B 60/1242* (2013.01)

(58) Field of Classification Search
CPC ...... G06F 3/0227; G06F 3/0346; G06F 3/038; G06F 3/165; G06F 1/1643; G06F 1/1686; G06F 1/169; G06F 1/1694; G06F 1/3206; G06F 1/3265; H04N 5/232; Y02B 60/1242
USPC ................ 345/156, 173–175, 204, 211, 212; 178/18.01–18.07
See application file for complete search history.

(56) References Cited

U.S. PATENT DOCUMENTS

| | | |
|---|---|---|
| 2005/0076302 A1 | 4/2005 | Okamoto |
| 2006/0128437 A1 | 6/2006 | Kim |
| 2009/0262078 A1 | 10/2009 | Pizzi |
| 2011/0080349 A1 | 4/2011 | Holbein et al. |
| 2011/0223973 A1 | 9/2011 | Li et al. |

(Continued)

*Primary Examiner* — Rodney Amadiz
(74) *Attorney, Agent, or Firm* — Birch, Stewart, Kolasch & Birch, LLP

(57) ABSTRACT

A method for controlling an electronic apparatus with a display and an input device, which comprises: sensing a tilt angle of the electronic apparatus in a sleep mode, wherein the display is off and the input device is non-active in the sleep mode; activating the input device without turning on the display based on the tilt angle of the electronic apparatus; receiving a user input from the input device while the display is off; and performing a predetermined function based on the user input.

20 Claims, 10 Drawing Sheets

(56) References Cited

U.S. PATENT DOCUMENTS

| | | |
|---|---|---|
| 2011/0264928 A1 | 10/2011 | Hinckley |
| 2012/0009896 A1 | 1/2012 | Bandyopadhyay et al. |
| 2012/0299936 A1* | 11/2012 | Ashjaee ................. G01C 15/00 345/501 |
| 2013/0135212 A1* | 5/2013 | Cheng ................... G06F 1/1626 345/168 |
| 2013/0182014 A1* | 7/2013 | Park ........................ G09G 5/00 345/649 |
| 2014/0168494 A1* | 6/2014 | Hong ................... G06F 1/3287 348/333.01 |

* cited by examiner (a)

(B)

(C)

METHOD FOR CONTROLLING ELECTRONIC APPARATUS AND ELECTRONIC APPARATUS APPLYING THE METHOD

CROSS-REFERENCE TO RELATED APPLICATION

This application is a Continuation application of co-pending application Ser. No. 14/149,791 filed on Jan. 7, 2014, the entire content of which is hereby incorporated by reference.

BACKGROUND OF THE INVENTION

1. Field of the Invention

The present invention relates to a method for controlling an electronic apparatus and an electronic apparatus applies the electronic method, and particularly relates to a method for controlling an electronic apparatus and an electronic apparatus that can active the electronic apparatus without pressing a hardware button or without turning on a display, and an electronic apparatus applies the electronic method.

2. Description of the Prior Art

A conventional handheld electronic apparatus, such as a mobile phone or a tablet PC, can operate in a sleep mode or a normal mode. Whole functionality for the handheld electronic apparatus is provided if the handheld electronic apparatus operates in the normal mode. On the contrary, some of the devices in the handheld electronic apparatus are non-active or turned off in the sleep mode (ex. the display is off and the touch sensing device for the handheld electronic apparatus is non-active), such that the power consumption for the handheld electronic apparatus is low but the functionality is limited.

A hardware button such as a lock/unlock button is always provided on the handheld electronic apparatus, thereby a user can awake the handheld electronic apparatus from the sleep mode via pressing the lock/unlock button. However, the lock/unlock button has a limited pressing times, thus it is easily broken if the user needs to press the lock/unlock button to active the electronic apparatus.

Additionally, for some conventional handheld electronic apparatuses, they are still locked after the lock/unlock button is pressed thus the function thereof still can't work. The display for the handheld electronic apparatus is on after the user presses the lock/unlock button, and then the user needs to perform another gesture to unlock the handheld electronic apparatus. After that, the user must input a command, such as a tap or a gesture, to control the handheld electronic apparatus to perform a desired function. Therefore, more power consumption is needed, since the display must keep on before the desired function is performed.

SUMMARY OF THE INVENTION

Therefore, one objective of the present invention is to provide a method for controlling an electronic apparatus, which can active the electronic apparatus without pressing a hardware button, and an electronic apparatus applying the method.

One embodiment of the present invention discloses a method for controlling an electronic apparatus with a display and an input device, which comprises: sensing a tilt angle of the electronic apparatus in a sleep mode, wherein the display is off and the input device is non-active in the sleep mode; activating the input device without turning on the display based on the tilt angle of the electronic apparatus; receiving a user input from the input device while the display is off; and performing a predetermined function based on the user input.

Another embodiment of the present invention discloses an electronic apparatus, which comprises: a main controller; an input device; a tilt angle sensing device, for sensing a tilt angle of the electronic apparatus in a sleep mode, wherein the display is off and the input device is non-active in the sleep mode; and a sub-controller, for activating the input device without turning on the display based on the tilt angle of the electronic apparatus. The input device senses a user input from the input device while the display is off, after activated by the sub-controller based on the tilt angle of the electronic apparatus. The sub-controller actives the main controller to control the electronic apparatus to perform a predetermined function based on the user input.

In view of above-mentioned embodiments, a user can active the electronic apparatus without pressing any hardware button, thus the breaking of the hardware button can be avoided. Additionally, the power consumption can be reduced since the activating time period for the main controller and the on time period of the display are dramatically reduced.

These and other objectives of the present invention will no doubt become obvious to those of ordinary skill in the art after reading the following detailed description of the preferred embodiment that is illustrated in the various figures and drawings.

DETAILED DESCRIPTION

The concept for the present invention will be explained via following embodiments. Please note a mobile phone is taken for example for explaining, but it does not mean the present invention is limited to be applied to a mobile phone. The control method provided by the present invention can be applied to any other electronic apparatus. Also, please note in the following embodiments, a touch screen, which can be regarded as an electronic device comprising a touch sensing device and a display integrated together, is applied as an example. Therefore, in the following description, if a display is mentioned, it mentions the display of the touch screen. If a touch sensing device is mentioned, it mentions the touch sensing device integrated to the touch screen. However, please note the electronic apparatus according to the present invention can comprise a display and a touch sensing device independent from each other.

Figure 1:
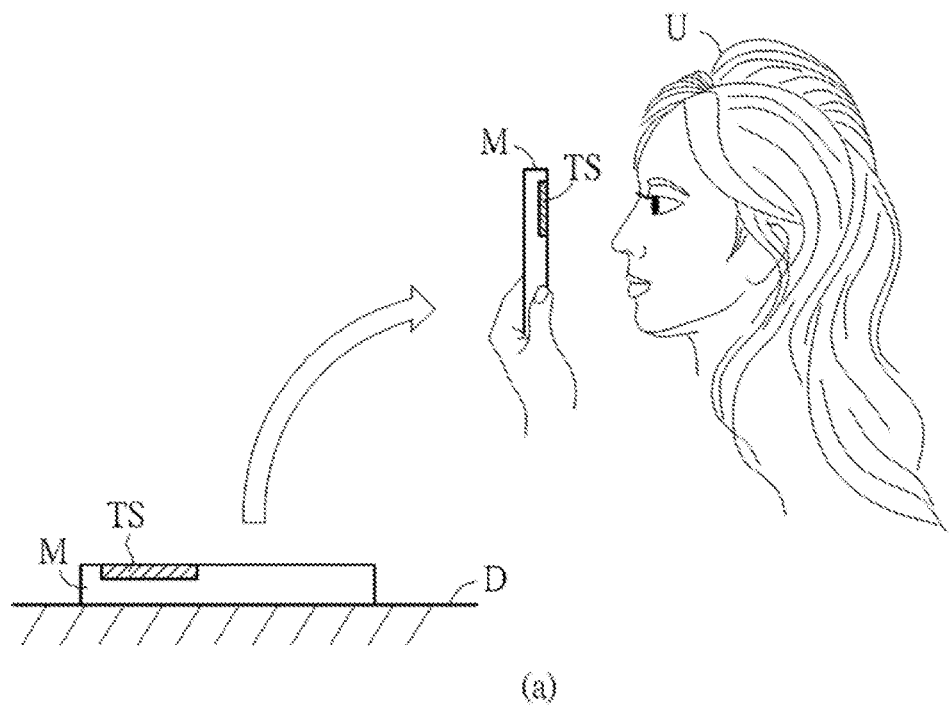
FIG. 1 is a schematic diagram illustrating an example for how the method for controlling an electronic apparatus according to one embodiment of the present invention works.
Figure 1:
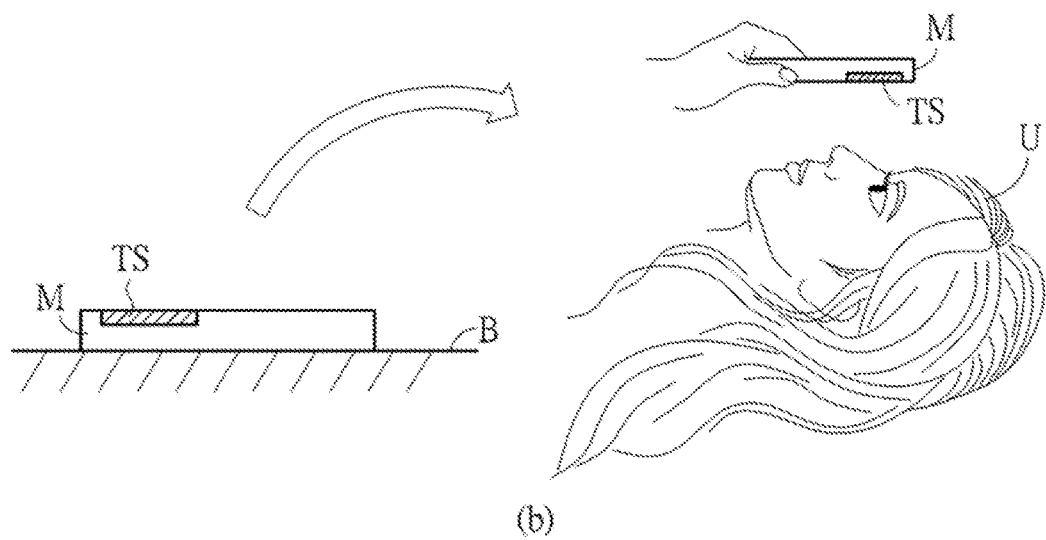

FIG. 1 is a schematic diagram illustrating an example for how the method for controlling an electronic apparatus according to one embodiment of the present invention works. As shown in FIG.(a) of FIG. 1, if the mobile phone M with a touch screen TS originally lays on a desk D, operates in a sleep mode, and a user U, who is standing or sitting, takes the mobile phone M from the desk D, a tilt angle of the mobile phone M is sensed. Alternatively, as shown in FIG.(b) of FIG. 1, if the mobile phone M originally lays on a bed B, operates in a sleep mode and a user U, who is laying down on the bed B, takes the mobile phone M from the bed D, a tilt angle of the mobile phone M is also sensed. In the sleep mode, the display is off. In one embodiment, the touch sensing device is non-active in the sleep mode, or the touch sensing device is active but the data it sensed is ignored. No matter which circumstance does the touch sensing device operates in, the mobile phone M does not respond the touch control operation applied to the touch sensing device in the sleep mode. After the tilt angle is sensed, the tilt angle is determined if it falls in a predeteiinined angle range. If yes, a user input from an input device of the mobile phone M is sensed, while the display is off. A predetermined function is performed based on the user input, with the display is on or the display is off.

Figure 2:
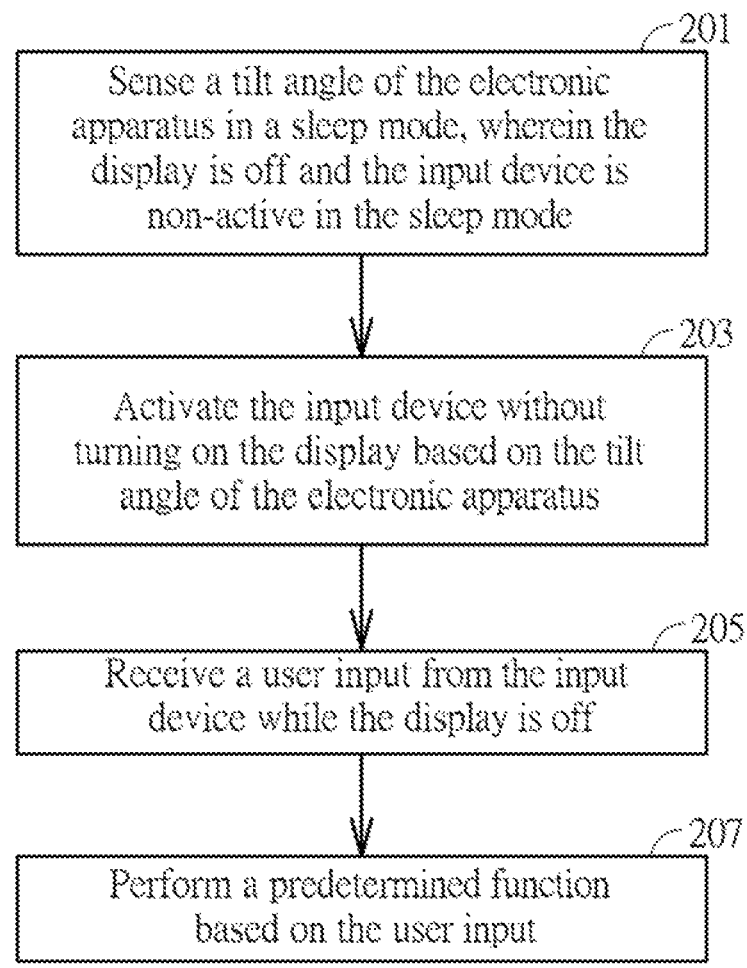
FIG. 2 is a flow chart illustrating a method for controlling an electronic apparatus according to one embodiment of the present invention.

The above-mentioned operation can be illustrated as the steps shown in FIG. 2, which is a flow chart illustrating a method for controlling an electronic apparatus according to one embodiment of the present invention. FIG. 2 comprises the following steps:

Step 201

Sense a tilt angle of the electronic apparatus in a sleep mode, wherein the display is off and the input device is non-active in the sleep mode.

Step 203

Activate the input device without turning on the display based on the tilt angle of the electronic apparatus.

Step 205

Receive a user input from the input device while the display is off.

Step 207

Perform a predetermined function based on the user input.

Figure 3:
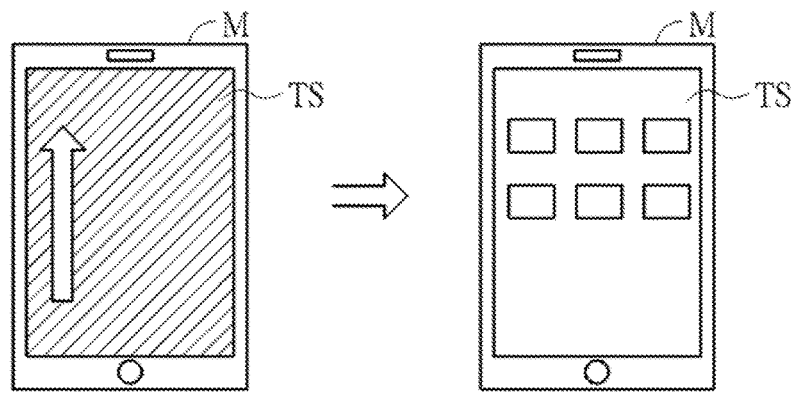
FIG. 3 is a schematic diagram illustrating the example that the user input is a gesture.
Figure 3:
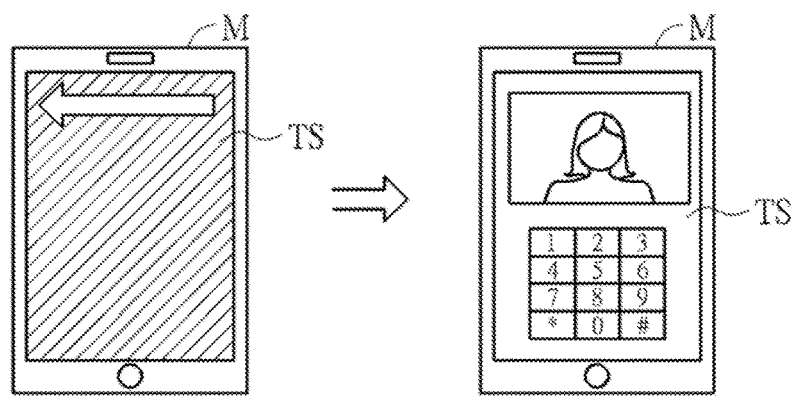
Figure 3:
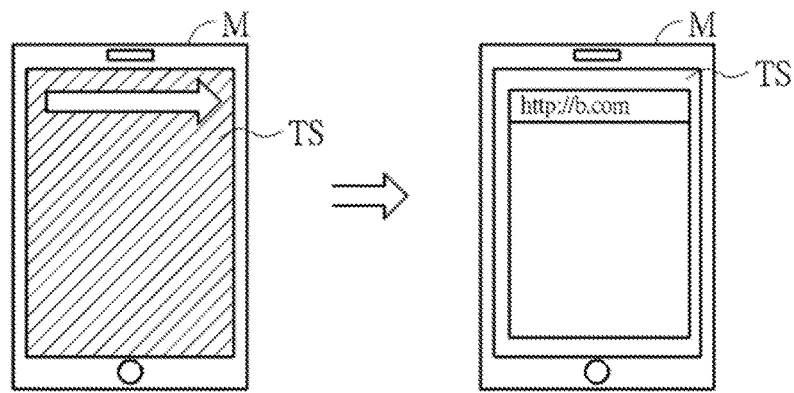

In one embodiment, the input device is a touch sensing device, and the user input is a gesture. If the user input meets a predetermined gesture, the mobile phone M performs a predetermined function. FIG. 3 is a schematic diagram illustrating the case that the user input is a gesture. Please note, the display is still off while receiving the user input. As shown in FIG. (a) of FIG. 3, if the user slides from down to up on the touch screen TS, the display is turned on, and the mobile phone M backs to a home scene. As shown in FIG. (b) of FIG. 3, if the user slides from right to left on the touch screen TS, the display is turned on, the mobile phone M launches a dialer program. Additionally, as shown in FIG. (c) of FIG. 3, if the user slides from left to right on the touch screen TS, the display is turned on, the mobile phone M launches a web browser program. Furthermore, in another embodiment not illustrated here, if the user continuously taps the touch screen TS for two times, only the display is turned on and no other function is performed. Please note the predetermined function is not limited to comprising turning on the display. For example, the predetermined function can be playing music while the display is off.

Figure 4:
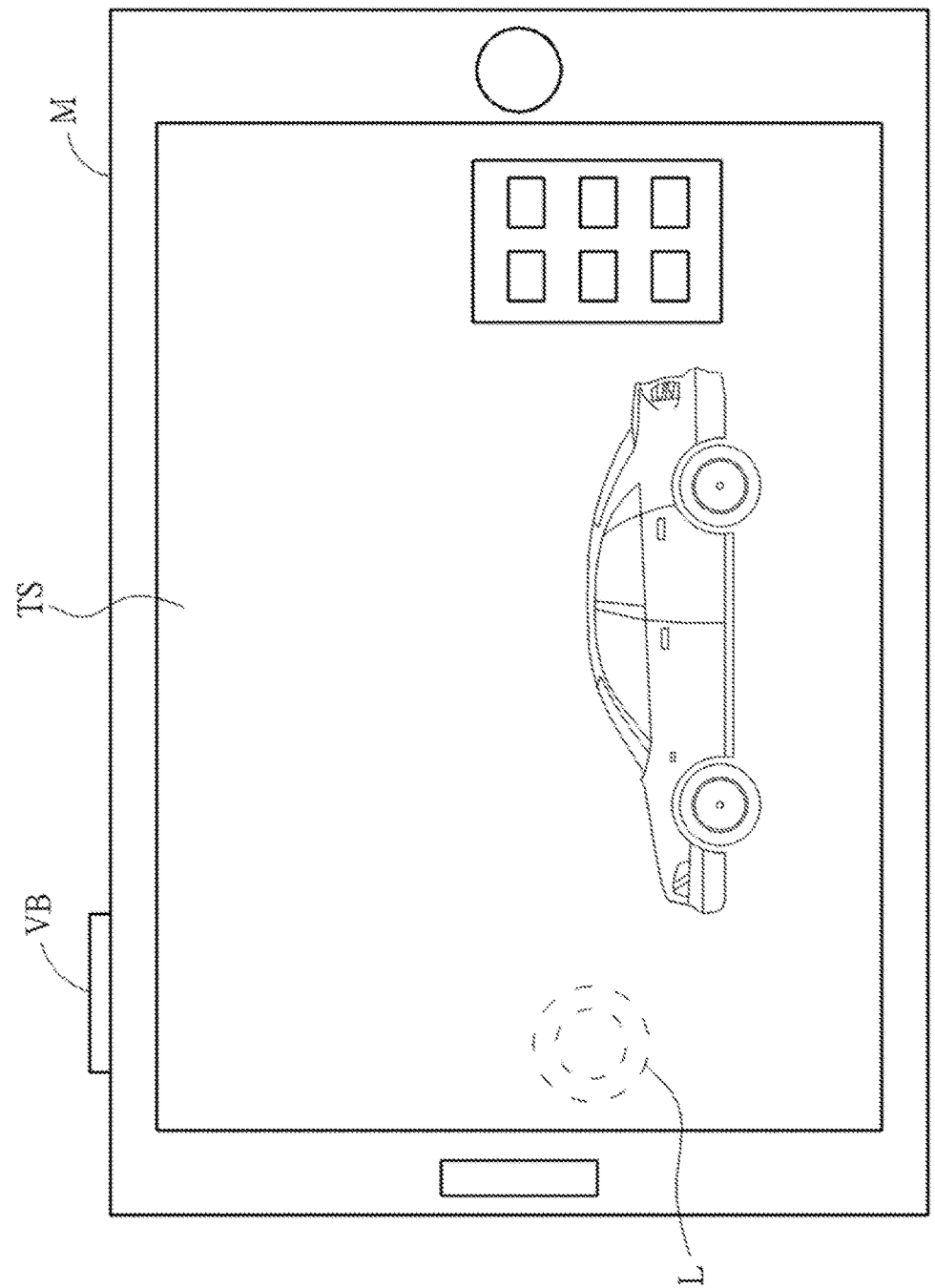
FIG. 4 is a schematic diagram illustrating the example that the user input is from a hardware button.

In another embodiment, the input device is a hardware button provided on the mobile phone M, for example, a hardware button for controlling a volume of the mobile phone M. FIG. 4 is a schematic diagram illustrating the case that the user input is from a hardware button (ex. pressing or pushing). As shown in FIG. 4, the mobile phone M comprises a camera and a hardware button VB for controlling a voice of the mobile phone M. The camera has a lens L provided at a back of the mobile phone M. If the hardware button VB is pressed or pushed, the display is turned on and a camera function (the predetermined function) is activated. Please note the mobile phone M is in a landscape mode in this example, but it can be in a portrait mode. Additionally, the hardware button VB can be a button for controlling other parameters of the mobile phone M, for example, the brightness of the touch screen TS. Additionally, the function activated by the activating applied to the hardware button is not limited to the camera function. Via this mechanism, the user can use different hardware buttons to active the electronic apparatus to perform the predetermined function, thus the breaking for the hardware button due to pressing too frequently can be avoided.

Figure 5:
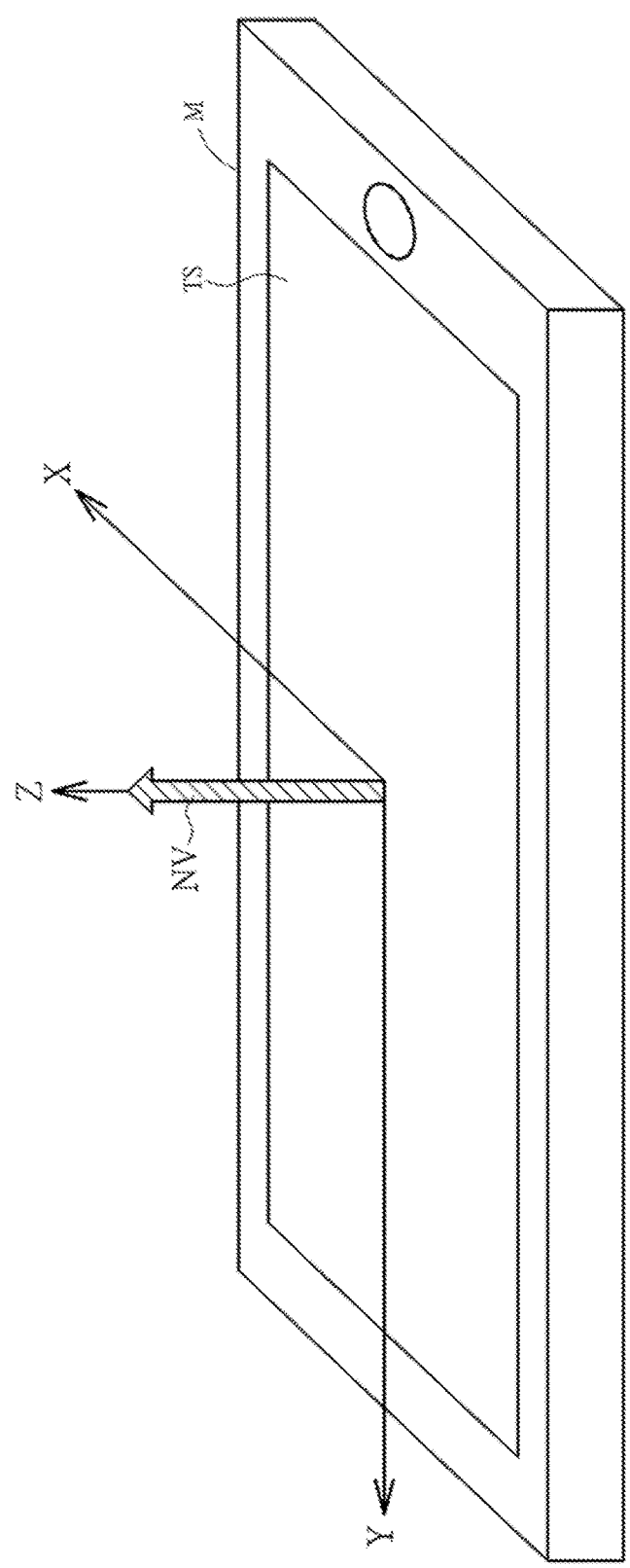
FIG. 5 is a schematic diagram illustrating the operation for sensing the tilt angle via a G-sensor, according to one embodiment of the present invention.

Various kinds of methods can be applied to sense the tilt angle of the mobile phone M, and one of them is using a G-sensor. FIG. 5 is a schematic diagram illustrating the operation for sensing the tilt angle via a G-sensor, according to one embodiment of the present invention. As shown in FIG. 5, the normal vector NV of the touch screen TS has an x component, a y component and a z component. Therefore, the direction of the normal vector NV can be acquired via sensing the x component, the y component and the z component, thereby the tilt angle for the mobile phone M can be acquired.

In one embodiment, a G-sensor is applied to sense the normal vector, therefore values pitch, roll and azimuth related with the x component, the y component and the z component can be acquired. In such embodiment, if the pitch is between $0°\sim85°$ and the roll is between $-30°\sim+30°$, activating the touch sensing device. In another embodiment, if the pitch is between $95°\sim150°$ and the roll is between $-150°\sim+180°$, activating the touch sensing device. In another embodiment, if the pitch is between $85°\sim95°$, activating the touch sensing device (in such case, the roll value can be ignored). However, the operation illustrated in FIG. 5S is not limited to be performed by a G-sensor.

Figure 6:
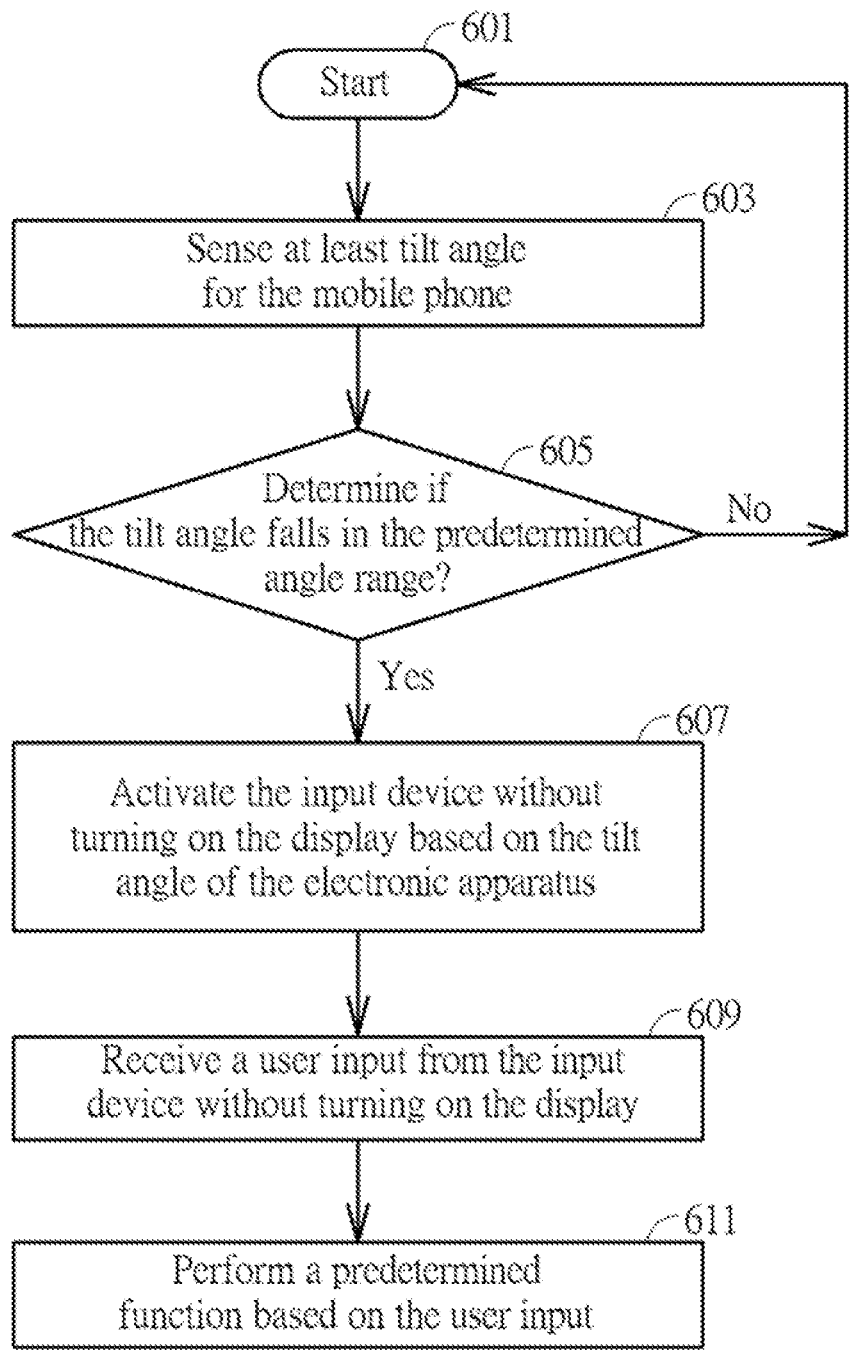
FIG. 6 is a flow chart illustrating more detail steps for a method for controlling an electronic apparatus according to one embodiment of the present invention.

FIG. 6 is a flow chart illustrating the steps for a method for controlling an electronic apparatus according to one embodiment of the present invention. As shown in FIG. 6, the method for controlling an electronic apparatus comprises the following steps:

Step 601

Start.

Step 603

Sense at least tilt angle for the mobile phone.

Please note there are various methods to start the step 603. In one embodiment, if the mobile phone M is originally in a stable situation (ex. kept flat on a desk or on a bed) and it is moved, the sensing for the tilt angle starts. The sensing for the tilt angle can be continuously performed even if the mobile phone M operates in the sleep mode. Such variation should also fall in the scope of the present invention.

Step 605

Determine if the tilt angle falls in the predetermined angle range. If yes, go to step 607, if not, go back to the step 601.

Step 607

Activate the input device without turning on the display based on the tilt angle of the electronic apparatus The tilt angle can be regarded as an environment parameter. In one embodiment, other environment parameters generated according to the environment surrounding the mobile phone M, such as speed, acceleration, brightness, moisture, can be further referred to determine if the input device should be activated.

Step 609

Receive a user input from the input device while the display is off.

In one embodiment, the input device is a touch sensing device which is activated for a predetermined period of time, thus the user input is determined to check if it matches a predetermined gesture in the predetermined period of time. In another embodiment, if no user input is received in the predetermined period of time, it goes back to the step 601 after the predetermined period of time. In still another embodiment, the input device is not limited to a touch sensing device and if no user input is sensed during the predetermined period of time, it goes back to the step 501 after the predetermined period of time.

Step 611

Perform a predetermined function based on the user input.

Figure 7:
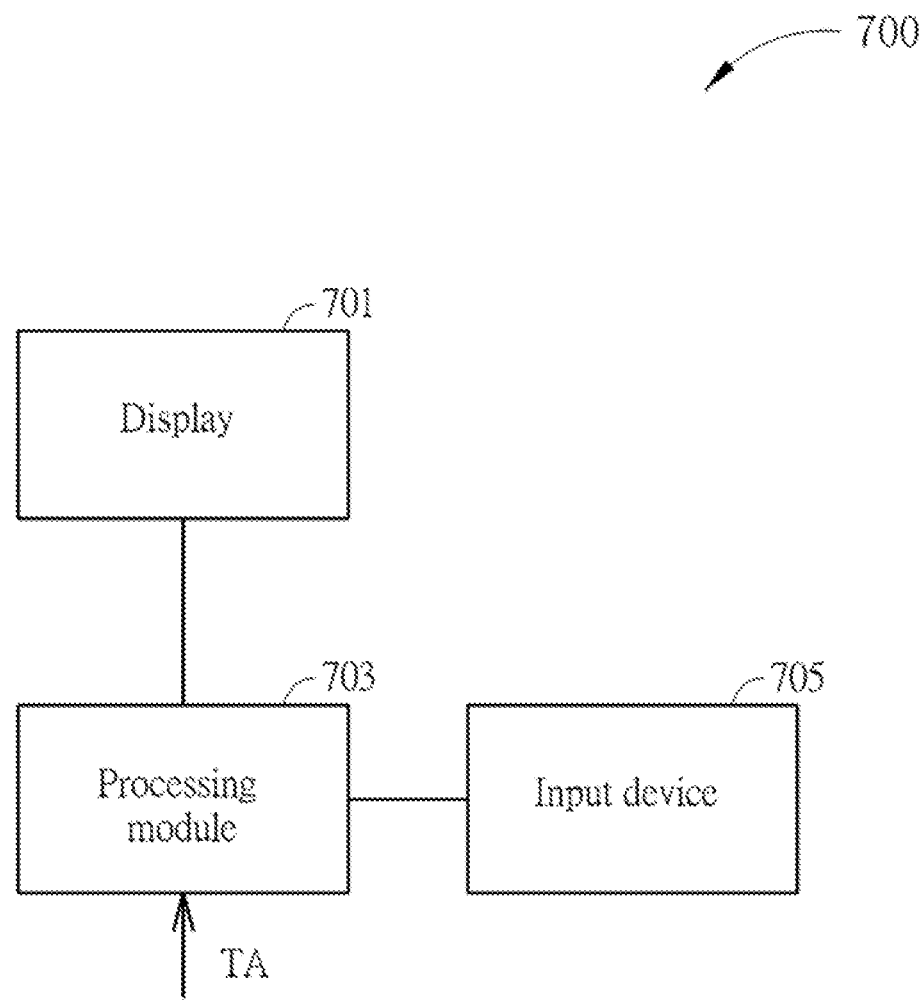
FIG. 7 is a block diagrams illustrating electronic apparatuses according to one embodiment of the present invention.

The above-mentioned methods can be applied to electronic apparatuses below. FIG. 7 is a block diagrams illustrating electronic apparatuses according to one embodiment of the present invention. AS shown in FIG. 7, the electronic apparatuses comprises: a display 701, a processing module 703, and an input device 705. The display is off and the input device 705 is non-active in the sleep mode. The processing module 703 connected to the display 701, the input device 705, and configured to: activate the input device 705 without turning on the display 701 based on a tilt angle TA of the electronic apparatus 700, receive a user input from the input device 705 while the display is off; and control the electronic apparatus 700 to perform a predetermined function based on the user input (ex. the examples in FIG. 3 and FIG. 4).

Figure 8:
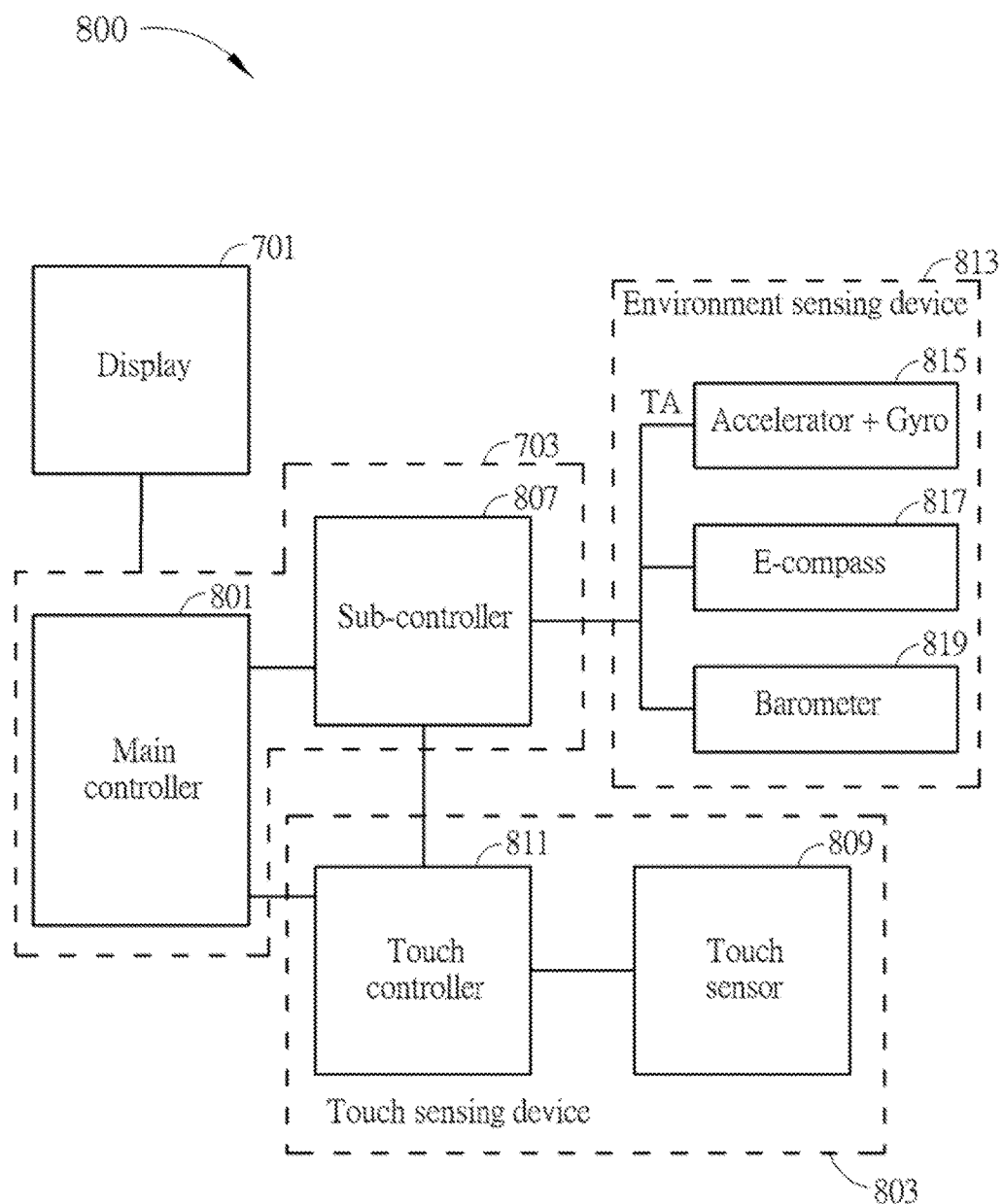
FIG. 8-FIG. 9 are block diagrams illustrating more detail blocks for electronic apparatuses according to different embodiments of the present invention.

FIG. 8 is a block diagram illustrating more detail blocks for the electronic apparatus according to one embodiment of the present invention. As shown in FIG. 8, the electronic apparatus 800 (ex. the above-mentioned mobile phone M), which can be another kind of electronic apparatus, comprises a main controller 801 (ex. a CPU), a touch sensing device 803, a G-sensor 815, and a sub-controller 807. Please note the above-mentioned processing module 703 can comprise the main controller 801 and the sub-controller 807, as shown in FIG. 8. The G-sensor 815 senses a tilt angle TA of the electronic apparatus 800 in a sleep mode, as shown in FIG. 1. The display 701 (ex. the abovementioned touch screen TS) is off and the input device (a touch sensing device 803 in this example, such as the abovementioned touch screen TS) is non-active in the sleep mode. Please note, the main controller 801 and the sub-controller 807 can be physically independent controllers. Or, the function thereof can be performed via executing different programs via a single processor.

The sub-controller 807 is activate in the sleep mode, for activating the touch sensing device 803 without turning on the display based on the tilt angle of the electronic apparatus 800. The touch sensing device 803 senses a user input (ex. the gesture in FIG. 4) from an input device while the display is off, after activated by the sub-controller 807 based on the tilt angle of the electronic apparatus 800. The sub-controller 807 actives the main controller 801 to control the electronic apparatus 800 to perform a first predetermined function (ex. the operation in FIG. 3 and FIG. 4) based on the user input. In one embodiment, the touch sensing device 803 comprises a touch sensor 809 and a touch controller 811. In such case either the sub-controller 807 or the touch controller 811 can receive the user input.

The G-sensor can be regarded as an environment parameter, as above-mentioned, in one embodiment, other environment parameters generated according to the environment surrounding the mobile phone M, such as speed, acceleration, brightness, moisture, can be further referred to determine if the operation for activating the input device should be performed. Therefore, the electronic apparatus 800 can further comprise an environment sensing device 813, which can comprise at least one of: a G-sensor 805, an E-compass 817 and a barometer 819. Please note the environment sensing device 813 is not limited to comprise the devices illustrated in FIG. 8.

As above-mentioned, in one embodiment, the input device (i.e. the touch sensing device) is activated for a predetermined period of time, thus the operation for sensing the control operation is performed in the predetermined period of time. In order to perform such operation, the electronic apparatus 800 can comprise a timer (ex. a counter), which can be implemented by software such as a program executed by the sub-controller or a hardware independent from other devices. The timer can continuously count to tell the sub-controller the counting value (the time), or just tells the sub-controller the counting value when it reaches the predetermine period of time. Additionally, the timer can be reset if the sub-controller receives any user input. Or, the timer can be reset only the user input meets a predetermined gesture. Timer is to control the time of enabling input device. Such variation or combination should fall in the scope of the present invention.

Figure 9:
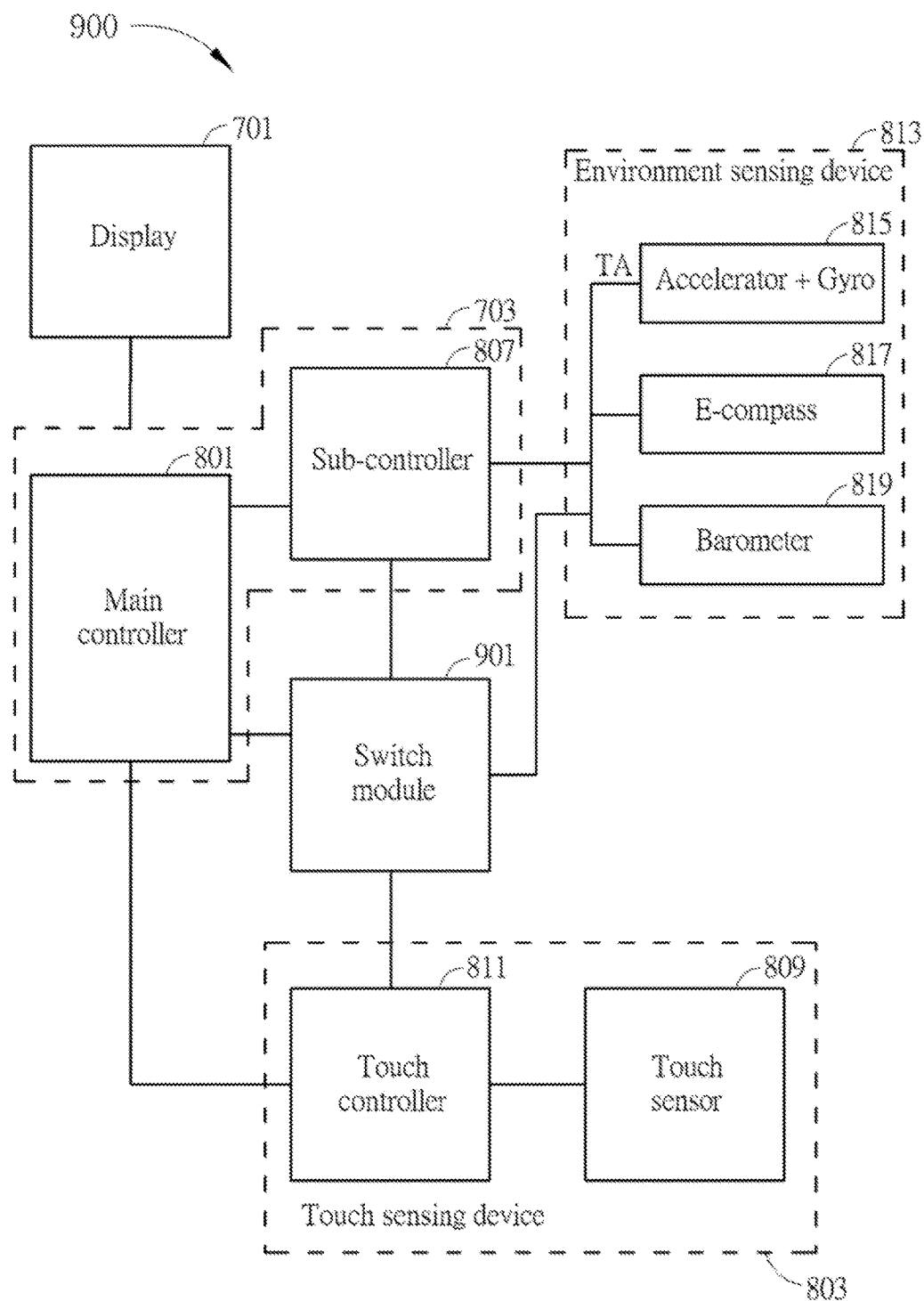

FIG. 9 is a block diagram illustrating an electronic apparatus 900 according to one embodiment of the present invention. Comparing with the electronic apparatus 800, the electronic apparatus 900 further comprises a switch module 901, which can comprise at least one switch device such as a multiplexer or a multiplexer. The switch module 901 is applied to select a preferable data transmitting path. For example, if the touch controller 811 receives the user input, the switch module 901 does not need to work. However, if the sub-controller 807 receives the user input, data about the user input is transmitted to the sub-controller 807 via the switch module 901. The existence of switch module 901 can cause other benefit besides selecting a preferable data transmitting path, for example, the pins for the each device can be saved. For more detail, each device is included in an IC comprising limited pins. If the switch module 901 does not exist, each IC must arrange their pins to other devices, such that different data paths can be formed. However, if the switch module 901 is provided, the pins for each device can be saved since each device can be coupled to the switch module 901 via one pin to form different data paths.

Figure 10:
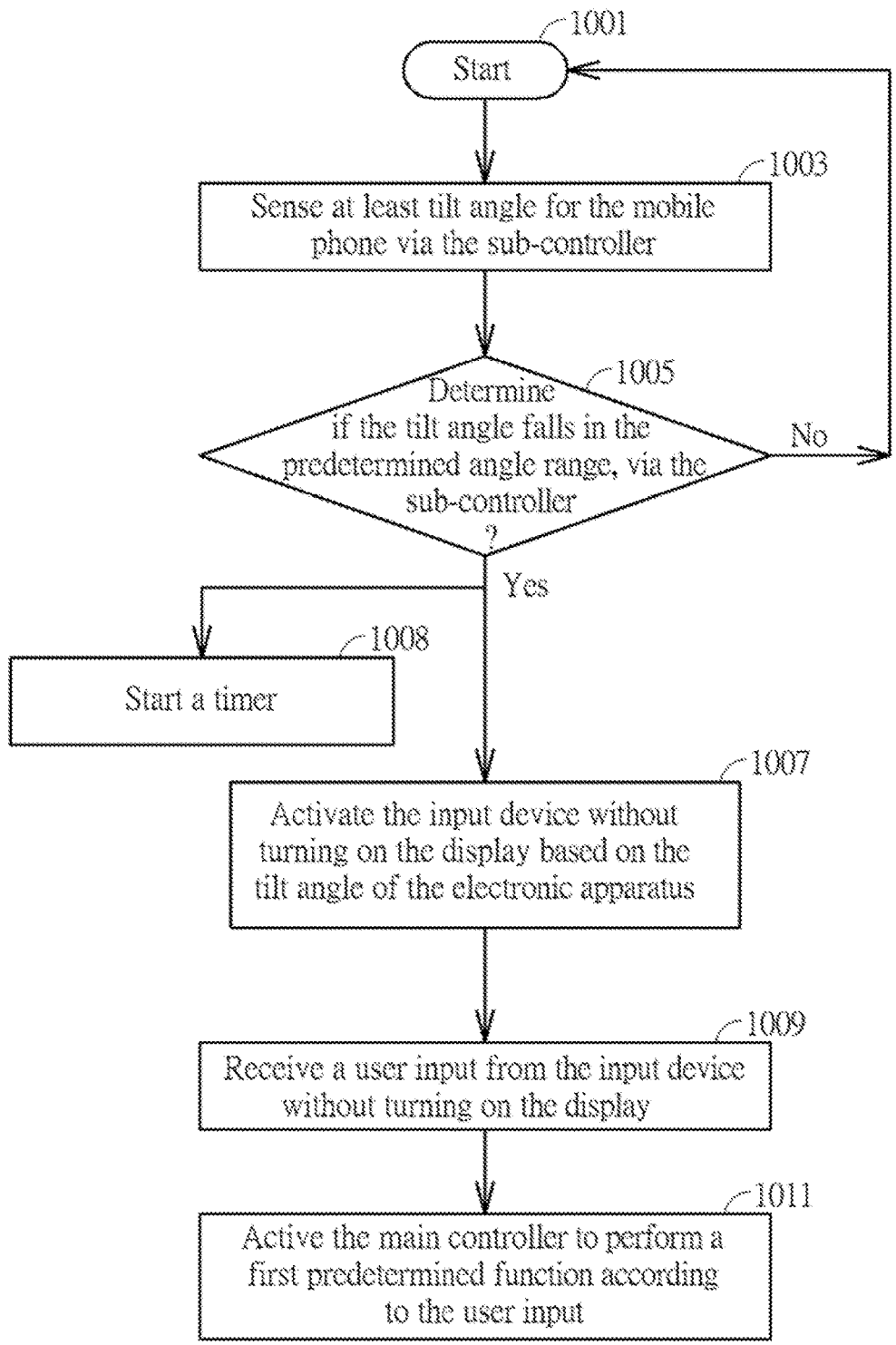
FIG. 10 is a flow chart illustrating the steps for a method for controlling an electronic apparatus according to another embodiment of the present invention.

FIG. 10 is a flow chart illustrating the steps for a method for controlling an electronic apparatus according to another embodiment of the present invention. The method in FIG. 10 comprises the following steps:

Step 1001

Start.

Step 1003

Sense at least tilt angle for the mobile phone via the sub-controller.

Please note there are various methods to start the step 1003. In one embodiment, if the mobile phone M is originally in a stable situation (ex. kept flat on a desk or on a bed) and it is moved, the sensing for the tilt angle starts. The sensing for the tilt angle can be continuously performed even if the mobile phone M operates in the sleep mode. Such variation should also fall in the scope of the present invention.

Step 1005

Determine if the tilt angle falls in the predetermined angle range, via the sub-controller. If yes, go to step 1007, if not, go back to the step 1001.

Step 1007

Activate the input device without turning on the display based on the tilt angle of the electronic apparatus Please refer to explanation about the steps 605, 607, the method for controlling an electronic apparatus provided by the present invention is not limited to determine if the tilt angle falls in the predetermined angle range, it can also start the sensing for the control operation based on other values of the tilt angle. Therefore, steps 1005 and 1007 can be summarized as: activating the touch sensing device without turning on the display based on the tilt angle of the electronic apparatus, via the sub-controller.

Step 1009

Receive a user input from the input device while the display is off.

As stated in the explanation about the step 609, in one embodiment, the input device is a touch sensing device which is activated for a predetermined period of time, thus the user input is determined to check if it matches a predetermined gesture in the predetermined period of time. In another embodiment, if no user input matching the predetermined gesture is received in the predetermined period of time, it goes back to the step 1001 after the predetermined period of time. In still another embodiment, the input device is not limited to a touch sensing device and if no user input meets a predetermined gesture is sensed during the predetermined period of time, it goes back to the step 1001 after the predetermined period of time. Therefore, the method in the step 1009 can further comprise a step 1008 to start a timer. The function of the timer has been illustrated in above-mentioned description, thus it is omitted for brevity here.

Step 1011

Active the main controller to perform a first predetermined function according to the user input.

All above-mentioned methods can be performed via executing a program recorded in a computer readable media, but not limited.

Besides the above-mentioned embodiments, in one embodiment, the input device is a touch sensing device and kept to be active, via the main controller or the sub-controller, for a predetermined period of time immediately after the display is turned off (ex. after the display is turned off but before enters the sleep mode). A user input from the input device is received while the display is off during this predetermined period of time, via the main controller or the sub-controller. Also, a predetermined function is performed based on the second user input. In another embodiment, the electronic apparatus is controlled to enter the sleep mode after the predetermined period of time, via the main controller or the sub-controller, when none of the second user input which is determined to meet the predetermined gesture is received from the input device during the predetermined period of time.

In still another embodiment, the input device is not limited to a touch sensing device and kept to be active for a predetermined period of time immediately, via the main controller or the sub-controller, after the display is turned off (ex. after the display is turned off but before enters the sleep mode). A user input from the input device is received without, via the main controller or the sub-controller, turning on the display during this predetermined period of time. The electronic apparatus is controlled to enter the sleep mode, via the main controller or the sub-controller, after the predetermined period of time, when no user input is received from the input device during the predetermined period of time In view of above-mentioned embodiments, a user can active the electronic apparatus without pressing any hardware button, thus the breaking of the hardware button can be avoided. Additionally, the power consumption can be reduced since the activating time period for the main controller and the on time period for the display are dramatically reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling an electronic apparatus with a display and a hardware button, comprising:
   determining the electronic apparatus in a sleep mode, wherein the display is off and the hardware button is non-active in the sleep mode;
   determining whether the electronic apparatus is moved and sensing a tilt angle of the electronic apparatus after the movement;
   in response to determining the electronic apparatus is moved and sensing a tilt angle of the electronic apparatus after the movement, activating the hardware button without turning on the display, wherein the hardware button is not activated if the electronic apparatus is not moved or if the electronic apparatus is moved and the tilt angle does not fall in a predetermined angle range after the movement, and wherein the electronic apparatus is held in a landscape mode when the tilt angle falls in the predetermined angle range;
   receiving a user input from the hardware button within a predetermined period of time while the display is off; and
   performing a camera function based on the user input;
   wherein the hardware button is applied to trigger the camera function while the display is off and applied to trigger another function rather than the camera function while the display is turned on.

2. The method of claim 1, further comprising:
   activating the hardware button without turning on the display for the predetermined period of time immediately after the tilt angle is determined to fall in the predetermined angle range.

3. The method of claim 1, wherein the step of activating the hardware button without turning on the display is further based on an environment parameter detected by the electronic apparatus.

4. The method of claim 1, further comprising:
   keeping the hardware button active for a predetermined period of time immediately after the display is turned off;

receiving a second user input from the hardware button while the display is off during the predetermined period of time immediately after the display is turned off; and performing a second predetermined function based on the second user input.

5. The method of claim 4, further comprising:

performing the second predetermined function with turning on the display based on the second user input.

6. The method of claim 1, further comprising:

keeping the hardware button active for a predetermined period of time immediately after the display is turned off;

determining if any second user input is received from the hardware button during the predetermined period of time;

entering the sleep mode after the predetermined period of time, after no second user input is received from the hardware button during the predetermined period of time.

7. The method of claim 1, wherein the hardware button is configured to control a volume of the electronic apparatus while the display is turned on.

8. An electronic apparatus, comprising:

a display;

a hardware button, wherein the display is off and the hardware button is non-active in the sleep mode;

a processing module connected to the display, the hardware button, and configured to:

determining the electronic apparatus in a sleep mode, wherein the display is off and the hardware button is non-active in the sleep mode;

in response to determining the electronic apparatus is moved and sensing a tilt angle of the electronic apparatus after the movement, activate the hardware button without turning on the display, wherein the hardware button is not activated if the electronic apparatus is not moved or if the electronic apparatus is moved and the tilt angle does not fall in a predetermined angle range after the movement, and wherein the electronic apparatus is held in a landscape mode when the tilt angle falls in the predetermined angle range;

receive a user input from the hardware button within a predetermined period of time while the display is off; and control the electronic apparatus to perform a camera function based on the user input; wherein the hardware button is applied to trigger the camera function while the display is off and applied to trigger another function rather than the camera function while the display is turned on.

9. The electronic apparatus of claim 8, wherein the processing module is further configured to:

activate the hardware button without turning on the display for the predetermined period of time immediately after the tilt angle is determined to fall in the predetermined angle range.

10. The electronic apparatus of claim 8, further comprising:

an environment sensing device connected to the processing module, configured to detect an environment parameter, wherein the processing module activates the hardware button without turning on the display further based on the environment parameter.

11. The electronic apparatus of claim 8, wherein the processing module is further configured to:

keeping the hardware button active for a predetermined period of time immediately after the display is turned off;

receiving a second user input from the hardware button while the display is off during the predetermined period of time immediately after the display is turned off; and performing a second predetermined function based on the second user input.

12. The electronic apparatus of claim 11, wherein the processing module is further configured to:

performing the second predetermined function with turning on the display based on the second user input.

13. The electronic apparatus of claim 8, wherein the processing module further comprises a main controller and a sub-controller connected to the main controller, wherein the sub-controller is configured to:

activate the hardware button without turning on the display based on the tilt angle of the electronic apparatus;

receive the user input from the hardware button while the display is off; activate the main controller to perform the predetermined function based on the user input.

14. The electronic apparatus of claim 8, wherein the hardware button is configured to control a volume of the electronic apparatus while the display is turned on.

15. A non-transitory computer-readable medium, recording a program, and the program being loaded to an electronic apparatus to execute following steps:

determining the electronic apparatus in a sleep mode, wherein the display is off and the hardware button is non-active in the sleep mode;

determining whether the electronic apparatus is moved and sensing a tilt angle of the electronic apparatus after the movement;

in response to determining the electronic apparatus is moved and sensing a tilt angle of the electronic apparatus after the movement, activating the hardware button without turning on the display, wherein the hardware button is not activated if the electronic apparatus is not moved or if the electronic apparatus is moved and the tilt angle does not fall in a predetermined angle range after the movement, and wherein the electronic apparatus is held in a landscape mode when the tilt angle falls in the predetermined angle range;

receiving a user input from the hardware button within a predetermined period of time while the display is off; and performing a camera function based on the user input;

wherein the hardware button is applied to trigger the camera function while the display is off and applied to trigger another function rather than the camera function while the display is turned on.

16. The non-transitory computer readable medium of claim 15, wherein the steps further comprising:

activating the hardware button without turning on the display for the predetermined period of time immediately after the tilt angle is determined to fall in the predetermined angle range.

17. The non-transitory computer readable medium of claim 15, wherein the step of activating the hardware button without turning on the display is further based on an environment parameter detected by the electronic apparatus.

18. The non-transitory computer readable medium of claim 15, wherein the steps further comprising:

keeping the hardware button active for a predetermined period of time immediately after the display is turned off;

receiving a second user input from the hardware button while the display is off during the predetermined period of time immediately after the display is turned off; and performing a second predetermined function based on the second user input.

19. The non-transitory computer readable medium of claim 18, wherein the steps further comprising:

performing the second predetermined function with turning on the display based on the second user input.

20. The non-transitory computer readable medium of claim 15, wherein the steps further comprising:

keeping the hardware button active for a predetermined period of time immediately after the display is turned off;

determining if any second user input is received from the hardware button during the predetermined period of time;

entering the sleep mode after the predetermined period of time, after no second user input is received from the hardware button during the predetermined period of time.

\* \* \* \* \*